United States Patent [19]

Majewski

[11] 4,401,189

[45] Aug. 30, 1983

[54] START/STOP CONTROL SYSTEM FOR CONVEYOR MEANS

[75] Inventor: Stanley J. Majewski, Chicago, Ill.

[73] Assignee: St. Charles Manufacturing Co., St. Charles, Ill.

[21] Appl. No.: 323,901

[22] Filed: Nov. 23, 1981

[51] Int. Cl.³ .............................................. B65G 47/00
[52] U.S. Cl. ....................................... 186/68; 186/69; 198/367
[58] Field of Search ....................... 186/59, 61, 66, 68, 186/69; 198/367, 442; 186/60

[56] References Cited

U.S. PATENT DOCUMENTS

| | | | |
|---|---|---|---|
| 3,076,528 | 2/1963 | Potrafke | 186/68 |
| 3,651,890 | 3/1972 | Potrafke | 186/68 |
| 3,819,012 | 6/1974 | Beck | 186/61 |
| 4,138,000 | 2/1979 | Hartup | 186/61 |
| 4,236,604 | 12/1980 | Warner | 186/61 |

FOREIGN PATENT DOCUMENTS 1193852  6/1970  United Kingdom ................ 198/367

Primary Examiner—Joseph J. Rolla
Assistant Examiner—Kevin P. Shaver
Attorney, Agent, or Firm—Robert E. Wagner; Ralph R. Rath; Leo J. Aubel

[57] ABSTRACT

A coordinated start/stop control system for controlling the operation of multiple conveyor checkout systems, wherein the operation of a pair of rear transport belts is selectively controlled in response to the operation of a first transport belt, dependent on the actuation of a magnetically operated electrical switch by a control magnet mounted on a diverter bar or arm.

9 Claims, 6 Drawing Figures

U.S. Patent     Aug. 30, 1983     4,401,189
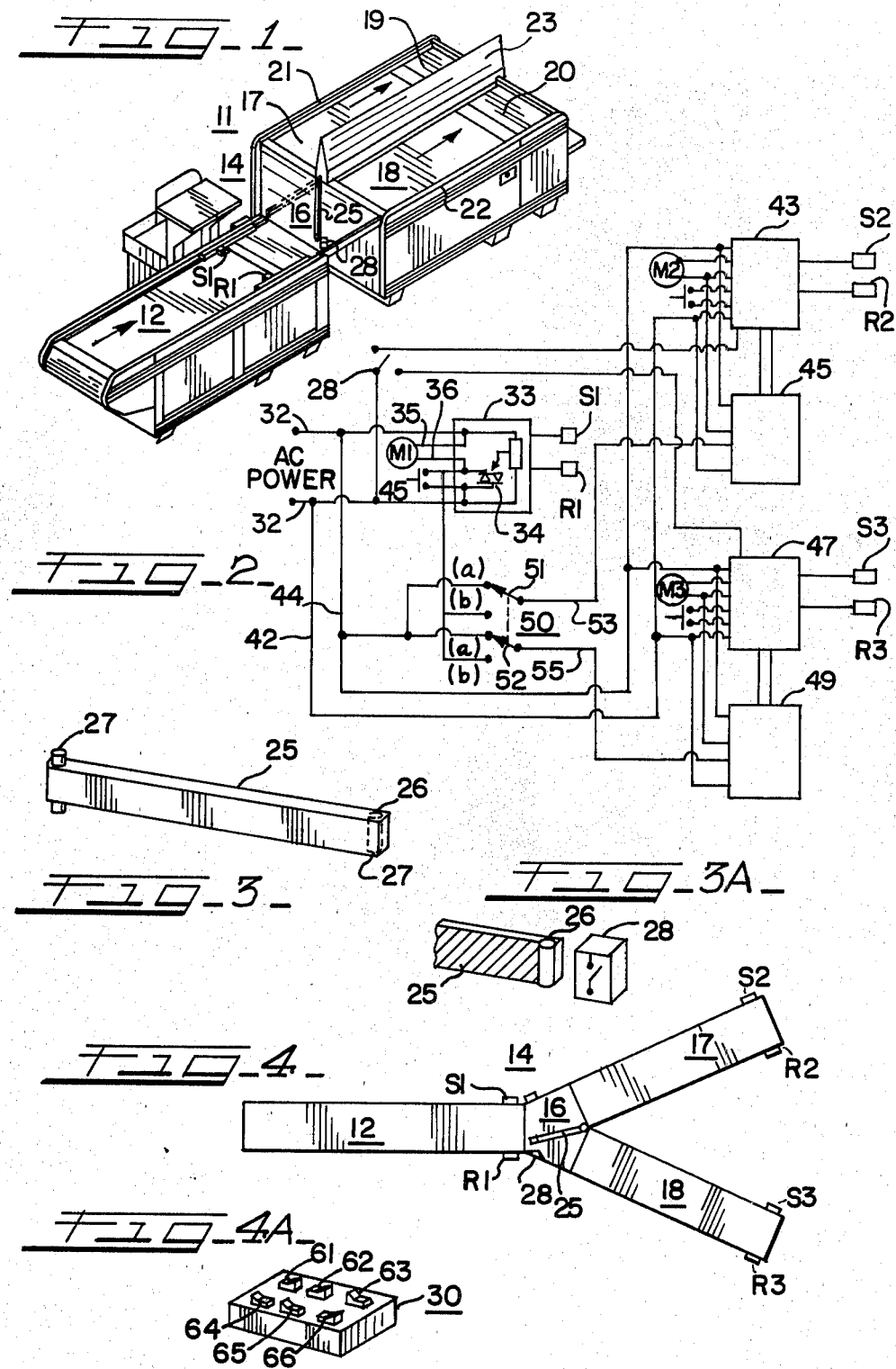

START/STOP CONTROL SYSTEM FOR CONVEYOR MEANS

BACKGROUND OF INVENTION

In a great majority of large grocery stores or supermarkets, customers select their groceries and then cart them in suitable carriages to a checking-out point where a cashier checks the items purchased and determines the total sale price to be paid by the customer. This method of merchandising has also been extended to other retail stores.

In such systems, conveyor belt means are frequently employed to feed a succession of items to be checked from an unloading position to a sacking position. In such arrangement, the customer unloads the items on a loading platform at the loading position and places them on the conveyor belt means, which leads them to a checking position where items are checked by the cashier. The items are then conveyed by another conveyor belt means to a sacking platform, where the sacker places the items in suitable bags or other containers.

It should be understood that the invention is applicable to material handling systems of various kinds; however, the preferred application of the invention is, as stated above, in connection with automated check-out systems in retail stores, particularly grocery stores or supermarkets; and it will hereinafter be described as applied to such systems. Also, the conveying means are preferably in the form of conveyor belts; but the invention is generally applicable to other various types of conveying apparatus.

Commonly, in systems under discussion, a sensing device is provided at the delivery end of the incoming conveyor belt, that is, at the end of the moving belt adjacent the check-out or cashier stand. The sensing device responds to the breaking of a light beam by the product or item first in line arriving at that end to automatically stop the moving operating belt. As the cashier lifts the product from the belt to check it out, the light beam again strikes the scanning device; and, as a result, the conveyor belt is restarted. This cycle repeats itself as the item next in line reaches this end of the conveyor belt.

When the number of items on the conveyor belt leading to the check-out system is light or becomes non-existent, that is, when no further items are being placed on the belt by waiting customers, the belt keeps running since the sensing device ceases to detect arriving products. As a consequence, there is unnecessary wear and tear on the belt and its driving equipment; and this is accompanied by a corresponding waste of energy.

U.S. Pat. No. 4,236,604 (which is incorporated herein by reference) discloses a sensing device, positioned at the delivery end of the conveying means, as a control for stopping the conveying means in response to the detection of an item by the sensing device; the patent also discloses a time control for automatically stopping the conveying means in response to the sensing device not detecting an item within a predetermined time interval. As shown in U.S. Pat. No. 4,236,604, the checked-out products are frequently packaged at a station separate from the check-out stand proper; and, in such cases, the checked-out products are transported from the check-out station to the packaging station by an additional outgoing conveying means. The aforementioned time control is arranged to stop both the incoming and outgoing conveying means responsive to no item being detected within a predetermined time by the sensing device at the delivery end of the incoming conveying means. By thus automatically also shutting down the outgoing conveyor at times when there is no demand, the wear and tear of this outgoing conveyor and its associated equipment is likewise reduced; and, importantly, the attendant waste of energy and operating expense is obviated.

SUMMARY OF INVENTION

The present invention is directed to an improvement for controlling the operation of multiple conveyor check-out systems, wherein the operation of a pair of rear transport belts is selectively controlled in response to the operation of a first transport belt, dependent on the actuation of a magnetically operated electrical switch by a control magnet mounted on a diverter bar or arm.

BRIEF DESCRIPTION OF THE DRAWINGS

The foregoing features and advantages of the present invention will be apparent from the following more particular description of the invention. The accompanying drawings, listed hereinbelow, are useful in explaining the invention wherein:

FIG. 1 is an isometric view, showing a commercial version of the check-out system incorporating the invention;

FIG. 2 shows a block diagram of the electrical and electronic control circuit of the invention;

FIG. 3 is an isometric view, showing the diverter arm with the control magnet mounted thereon;

FIG. 3A is a sketch, useful in explaining the operation of the diverter arm and control magnet of FIG. 3; and FIGS. 4 and 4A are sketches, useful in explaining the invention.

DESCRIPTION OF THE INVENTION

FIG. 1 illustrates a check stand 11, embodying the invention and employing a front transport belt or conveyor 12 which carries items in the direction of the arrow from a loading point to a check-out or cashier position, indicated at 14. As is well-known, a photoelectric sensor S1-R1 (see also FIG. 4, which is a sketch illustrative of FIG. 1) senses the presence of an item in position and causes the belt 12 to stop to permit an item to be handled by the cashier. Reference is made, for example, to the above-cited U.S. patent (No. 4,236,604), and also to U.S. Pat. No. 2,723,728, both incorporated herein by reference for certain descriptions of such prior art systems.

The items on the front transport 12 are next lifted by the cashier, processed, and pushed onto a common ramp 16, which leads to a pair of separate rear transport belts or conveyors 17 or 18. The transport belts 17 and 18 extend to respective loading platforms 19 and 20. Suitable guard rails 21 and 22 extend upwardly above the outer edges of the transport belts 17 and 18 for preventing items from falling off the edges of the platforms. A longitudinally extending center separating member 23 separates the two rear transport belts 17 and 18, and the loading platforms 19 and 20. The front transport belt 12, the common ramp 16 and the rear transport belt 17 constitute a continuous track or lane to loading platform 19; likewise, front transport belt 12, the common ramp 16 and rear transport belt 18 constitute a continuous track or lane to loading platform 20.

A separator or diverter bar 25 (see also FIG. 3) is pivotably or swingably mounted, as by a suitable pivot 27, from adjacent the forward end of the transport belts 17 and 18 to be selectively moved and positioned from the right side of the ramp 16 to the left side of the ramp, as indicated by the dotted lines in FIG. 1. The bar 25 thus directs items toward one or the other of the rear transport belts 17 and 18.

Refer now to FIG. 3A. Importantly, the diverter bar 25 has a rod magnet 26 mounted adjacent its free end. In the embodiment shown, the rod magnet 26 is received in a recess 27 in the end of the bar 25, which is of a non-magnetic material, and secured thereto as by a suitable adhesive. A magnetically actuatable switch 28, of conventional design, is mounted adjacent the right side of ramp 16, such that, when the bar 25 is positioned fully to that location, the magnet 26 will operate switch 28. As will be explained, switch 28 selectively controls the operation of rear transport belts 17 and 18. Only when diverter bar 25 is in a fully-diverted position will the switch 28 be actuated from one to its other condition; accidental operation of switch 28 is thus avoided.

As indicated in FIG. 3A, when magnet 26 is moved to a fully-diverted position, switch 28 is caused to close, thereby causing the rear transport belt 17 to operate with front belt 12; conversely, when diverter bar 25 is moved away from switch 28, the right rear belt 18 is caused to operate with the front belt 12, as will all be explained.

A photoelectric sensor system S1-R1, as indicated in FIG. 4, is positioned on opposite sides of front transport belt 12 adjacent the check-out position 14. As described above, when an item arrives at the check-out position 14, the sensor system S1-R1 is actuated, as is well-known, causing the normally operative circuit for the motor M1 (see FIG. 2) to stop. Motor M1 drives the front transport belt 12; and, hence, when motor M1 stops, the belt 12 stops. When the check-out clerk lifts the item from the transport belt 12, the light beam from sensor S1 again impinges on receiver R1, thereby closing the circuit for belt drive motor M1 so that belt 12 again resumes movement.

In the event that there are no items on the front transport belt 12 for a given period of time, an automatic turn-off or energy saver circuit, including a timer circuit, automatically turns off the transport belt 12 drive motor M1 a preset time period after the last product is sensed by the sensor S1-R1. One such circuitry is described in U.S. Pat. No. 4,236,604.

The inventive system thus comprises a multiple conveyor system wherein the products move to a point adjacent the cashier (check-out clerk), on the first or front transport belt 12; the cashier next moves these products onto a ramp 16 and onto the rear transport belt 17. Belt 17 moves the products to a loading platform 19. When that particular order has been processed, the cashier can proceed immediately to process the next order without having to wait for the first order to be packaged by merely moving the bar 25 to its dotted line position, as shown in FIG. 1, whereby additional items of the second order are moved from the front transport belt 12, down the ramp 16 to the right rear transport belt 18, and to the second loading platform 20. As will be appreciated, this will expedite the processing of orders in that the cashier can continue to process orders without waiting for the orders to be actually removed from the respective loading platform.

The start/stop apparatus for the control system of FIG. 1 will now be explained more particularly with additional reference to FIGS. 2, 3 and 4. One of the important features of the invention is, as stated above, that the diverter bar 25 includes a magnet 26 mounted on its end, which actuates or operates a magnetically actuated switch 28 to initiate or vary the operation of the control circuit, as will be explained. Accordingly, the operator must operate the bar 25 to cause the items to move to block one or the other of the transport belts 17 and 18. Further, the bar 25 must be moved freely to the position shown in FIG. 1 in solid lines to initiate the desired operation with switch 28 closed. Accordingly, this is a feature which insures that the proper items are processed with each order and not mixed with another order, and that the cashier does not make a mistake in forgetting to actuate or close a switch to cause one or the other of the rear transport belts 17 and 18 to become operative.

As each new demand for movement of the conveyor belt 12 arises, the check-out clerk manually interrupts the light beam S1-R1, for example, by passing her hand through the light beam to momentarily interrupt the beam path. When, immediately thereafter, the clerk's hand moves out of the path of the light beam so that the light impinges again on receiver R1, the motor M1 for conveyor 12 is restarted and the timer circuit is activated. Hence, the control arrangement is restored to its normal operating condition. Accordingly, the use of electrical energy during slack periods is automatically minimized; and the wear and tear on the conveyor belts and their associated equipment is reduced.

The present invention discloses an improvement over the prior art in providing a means for selectively controlling multiple transport belts singly and in combination to effect a more efficient check-out operation. More specifically, the front transport belt 12 of FIGS. 1 and 4 can be operated independently or in combination with either of the rear transport belts 17 and 18; and each of the rear transport belts 17 and 18 can also be operated independently of the other transport belts.

A switch console 30 (see FIG. 4A) is mounted adjacent the check-out position. Switch console 30 includes switches 61 through 66. Switches 61, 62 and 63 are three-position rocker-type switches which have a left-up position, a level or center position, and a right-up (left-down) position. For purposes of the following explanation, left-up position will be referred to as "on", level or center position will be referred to as "off", and right-up position will be referred to as "manual".

Switch 61 controls the operation of the front transport belt 12; switch 62 controls the operation of the left rear transport belt 17; and switch 63 controls the operation of the right rear transport belt 18.

When switch 61 is in manual, switch 64 (which is a momentary closure switch and which may be a foot switch) overrides the photosensor controls S1-R1 and provides manual jogging (stepped movement) control of the front transport belt 12. With magnetic switch 28 open, bar 25 in the dotted line position of FIG. 1, and switches 61, 62 and 63 "ON", then, when an item interrupts sensors S1-R1 and the item is removed, front transport belt 12 is caused to move. Right transport belt 18 is also caused to move for a selected period of time, say, 20 seconds. If switches 62 and 63 are off or on manual, and switch 61 is ON, only front transport belt 12 is caused to move.

With magnetic switch 28 closed (the solid line position of FIG. 1), switches 61, 62 and 63 ON, then, when an item interrupts sensors S1-R1 and the item is removed, front transport belt 12 is caused to move; and the left rear transport belt 17 moves for 20 seconds.

With switches 61, 63 and 64 all "ON" and magnetic switch 28 closed, the operator initiates operation of the system by momentarily intercepting the light beam in the photosensors S1-R1, as described above, the front belt 12 moves for 20 seconds. The first item coming down the belt 12 and intercepting the sensors S1-R1 stops the belt 12; belt 17 continues to move for 20 seconds. When the item is removed, the front belt 12 moves; and the left belt 17 continues to move for a new 20-second period. Next, when the first item intercepts the sensors S2-R2 for the left rear belt 17, the belt 17 stops. Additional items intercepting the front transport sensors S1-R1, when removed, cause the front transport belt 12 to move and also cause the belt 17 to be jogged (stepped). Accordingly, the first item moves continually to the end of belt 17 and is stopped; but the succeeding items are jogged or stepped toward the end of the belt 17. As items are removed from the end of the belt 17, the belt 17 will move until the next item on the belt 17 will intercept the light beams of the sensors S2-R2. An operational time N for belt 17 causes belt 17 to keep moving for 20 seconds after an item is removed from the sensors S2-R2 beam if no additional item interrupts the beam.

When the magnetic switch 28 is open and switch 61 is in the ON position, this enables operation of the right rear belt 18 and sensors S3-R3 in the same manner as described above for belt 17 and sensors S2-R2. Thus, operation of the left and right transport belts 17 and 18 is similar, dependent on which way the magnetic switch 28 is actuated.

If both the switches 62 and 63 are "ON", and the magnetic switch 28 shifts from the left rear transport belt 17 to the right rear transport belt 18, the belt 17 or 18 which is not actively receiving the goods from the front transport belt 12 will continue to be operated independently of the other two belts. The timing interval of the rear belts 17 and 18 is independent of the operation of the front transport belt 12; that is, if the magnetic switch 28 is in an open position and the front transport belt 12 is actuated, the associated right transport belt 18 will be operable, as discussed above. The left transport belt 17 will be operable independently each time an item is removed from interrupting the beam of sensors S1-R1; and the transport belt 17 will move until a succeeding item interrupts the photoelectric sensor S2-R2 or until the 20-second period provided by the timer elapses.

Momentary switches 65 and 66 provide a manual override of the respective left and right transport belts 17 and 18, provided that switches 62 and 63 are in the manual position. Whenever switches 66, 62 or 63 are initially moved to an ON position, the respective transport belts 12, 17 and 18 are caused to move for a 20-second period.

FIG. 2 shows one embodiment of an electrical circuit 31 for switching in the transport belts 12, 17 and 18, as discussed hereinabove. In FIG. 2, the power from the AC power line is coupled through leads 32 to a module 33, containing circuits as disclosed in U.S. Pat. No. 4,236,604 and manufactured by Tritronics Company, Inc., Oak Brook, Illinois. As described in said patent, the unit comprises a module which includes the timer circuit for providing a 20-second timing cycle.

A sensor circuit, comprising the photoelectric source S1 and the receiver R1 of FIG. 1, is connected to module 33 such that interruption of the beam by an item passing between the sensor circuits S1-R1 will selectively activate the circuit of module 33, as disclosed in the aforesaid patent. The motor M1 for driving the transport belt 12 is coupled to said module and is selectively energized by the module 33. A solid state control device, such as a triac 34, is provided to control the operation of the motor M1. As is known, when the triac 34 is rendered conductive, such as by the interruption of the photoelectric sensor S1-R1, the triac 34 is biased to conduct, thereby closing the circuit for the motor M1 through module 33, lead 35, motor M1, lead 36, through the triac, and the other lead to the AC power supply. As will be obvious, when this occurs the motor M1 will drive the transport belt 12 until such time as the item is removed from a position interrupting the beam of sensors S1-R1, thereby opening the circuit of the triac 34 and opening the circuit to motor M1.

It will be appreciated that normally open switch 64 is connected in parallel with triac 34; and, when it is momentarily closed, it will also close the switch of motor M1 to thereby permit operator actuation of the transport belt 12.

The AC power line is also coupled through leads 42 and 44 to provide power to the modules 43, 45 associated with the rear transport belt 17, and also to provide power to modules 47 and 49 associated with the rear transport belt 18. Modules 43 and 47 are similar to modules 33, described above. Modules 45 and 49 are multiple-belt control modules, Model No. TTR-QX and Model No. ILS-Q, manufactured by The Tritronics Company, Inc., cited above. These latter modules also provide a selected time delay for the various units, as described in the above-cited U.S. Pat. No. 4,236,604. Switch 50 is a double-pole switch, has a movable contact 51 connected through lead 53 to module 45, and its other movable contact 52 connected through lead 55 to module 49. The stationary contacts (a) of switch 50 are connected to one side of the power line; and the stationary contacts (b) of switch 50 are connected to one side of motor M1. In the position of switch 50, as shown, power is coupled to modules 43, 45, 47 and 49 through leads 42 and 44.

In one position of switch 28, the modules 43 and 45 are operated in conjunction with module 33; and modules 47 and 49 are operated independently of module 33. Likewise, in the opposite position of switch 28, the modules 47 and 49 are operated in conjunction with module 33, and the modules 43 and 45 are operated independently of module 33, to provide the functions described above.

The inventive structure thus provides improved circuitry and structure for positively and conveniently controlling the operation of a multiple conveyor system to expedite the processing of items passing through a given position.

While the invention has been particularly shown and described with reference to a preferred embodiment thereof, it will be understood by those skilled in the art that various changes in form and details may be made therein without departing from the spirit and scope of the invention.

I claim:

1. A control system for an item checking stand having an onloading point and at least two packaging stations, means defining respective tracks extending past a checking station from said onloading point to said packaging stations, a first conveyor belt extending from said onloading point toward said checking station for feeding a succession of items to be checked to said checking station, a second conveyor belt extending from a position that is adjacent said checking station and to a first packaging station, a third conveyor belt extending from said position to a second packaging station, respective motor means for driving said belts, switch means for selectively engaging said motors whereby said first belt may be driven concurrently with said second belt and said first belt may be driven concurrently with said third belt, second switch means for selectively engaging said motors to drive said second and third belts independently of said first belt, a diverter bar having a magnet mounted on one end thereof, a magnetically actuable switch mounted adjacent said position, said bar being movable between the ends of said second and third belts to selectively actuate said magnetically actuable switch for selectively controlling the operation of said second and third belts.

2. A control system as in claim 1, wherein said control means includes switch means for deenergizing said motor in response to the actuation of said control means by the advancement of an item by said belt to said control means.

3. A control system as in claim 1, wherein said conveyor means comprises an elongated movable belt and said control means comprises an elongated bar pivotally mounted at one of its ends at one side of said belt and extending across said movable belt in the path of items thereon, and switch means responsive to pivotal movement of said bar for controlling the state of energization of said driving means.

4. A control system as in claim 1, further including a common ramp for said first, second and third belts, and said diverter bar mounted to be pivotable over said ramp to selectively divert items placed on said ramp toward said second or third belts.

5. A control system as in claim 1, wherein movement of said diverter bar to essentially completely block the passage to said third belt is necessary to actuate said magnetically actuable switch.

6. A control system as in claim 1, wherein said diverter bar is pivotably mounted on its one end, and a magnet is mounted on the other and free end of said bar.

7. A control system as in claim 1, further including a switch console including switches operable in conjunction with said magnetically actuable switch, electronic circuitry responsive to the operation of said switches to selectively actuate said first and second belts in synchronism with one another and said third belt independently of said first and second belts.

8. A control system as in claim 7, wherein said first and third belts are actuated in synchronism with each other and said second belt is actuated independently of said first and third belts.

9. A control system as in claim 7, wherein said belts are each operable independently of each other.

* * * * *